United States Patent
Behera et al.

(10) Patent No.: US 11,604,699 B2
(45) Date of Patent: Mar. 14, 2023

(54) RESUME SUPPORT FOR CLOUD STORAGE OPERATIONS

(71) Applicant: EMC IP Holding Company LLC, Hopkinton, MA (US)

(72) Inventors: Sarat Kumar Behera, Bangalore (IN); Anurag Bhatnagar, Bangalore (IN); Rabi Shankar Shaw, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 17/132,042

(22) Filed: Dec. 23, 2020

(65) Prior Publication Data

US 2022/0197748 A1    Jun. 23, 2022

(51) Int. Cl.
| G06F 11/00 | (2006.01) |
| G06F 11/14 | (2006.01) |
| G06F 16/182 | (2019.01) |
| H04L 67/1097 | (2022.01) |
| H04L 67/06 | (2022.01) |

(52) U.S. Cl.
CPC ........ *G06F 11/1438* (2013.01); *G06F 16/182* (2019.01); *H04L 67/06* (2013.01); *H04L 67/1097* (2013.01); *G06F 2201/85* (2013.01)

(58) Field of Classification Search
CPC combination set(s) only.
See application file for complete search history.

(56) References Cited

U.S. PATENT DOCUMENTS

| 9,563,628 B1* | 2/2017 | MacNeill | G06F 11/16 |
| 2015/0127773 A1* | 5/2015 | Liao | H04L 67/06 |
| | | | 709/217 |
| 2018/0322157 A1* | 11/2018 | Lee | G06F 16/27 |
| 2021/0011822 A1* | 1/2021 | Daida | G06F 3/0659 |
| 2021/0034571 A1* | 2/2021 | Bedadala | G06F 21/6227 |

OTHER PUBLICATIONS

Ryussi Technologies, "SMB vs. NFS," https://www.mosmb.com/smb-vs-nfs/, Apr. 17, 2017, 4 pages.
Wikipedia, "Offset (computer science)" https://en.wikipedia.org/w/index.php?title=Offset_(computer_science)&oldid=951535172, Apr. 17, 2020, 1 page.
D. McKay, "Linus File Timestamps Explained: atime, mtime, and ctime," https://www.howtogeek.com/517098/linux-file-timestamps-explained-atime-mtime-and-ctime/, Feb. 12, 2020, 12 pages.
Dell EMC, "Dell EMC Unity Cloud Tiering Appliance (CTA), A Detailed Review" White Paper, Mar. 2019, 32 pages.
Muonics, Inc. "Object Identifier Values," http://www.muonics.com/Docs/MIBSmithy/UserGuide/oidvalues.php, Accessed Sep. 10, 2020, 3 pages.

* cited by examiner

*Primary Examiner* — Umar Cheema
*Assistant Examiner* — Tesfu N Mekonen
(74) *Attorney, Agent, or Firm* — Ryan, Mason & Lewis, LLP

(57) ABSTRACT

A method comprises storing information corresponding to a plurality of files being written from a source storage device to a cloud storage platform in a file transfer operation. The method further comprises, in response to a failure of the file transfer operation, identifying from the information one or more file offsets successfully written to the cloud storage platform for one or more of the plurality of files prior to the failure. The file transfer operation for the one or more of the plurality of files is resumed from the identified one or more file offsets.

20 Claims, 7 Drawing Sheets

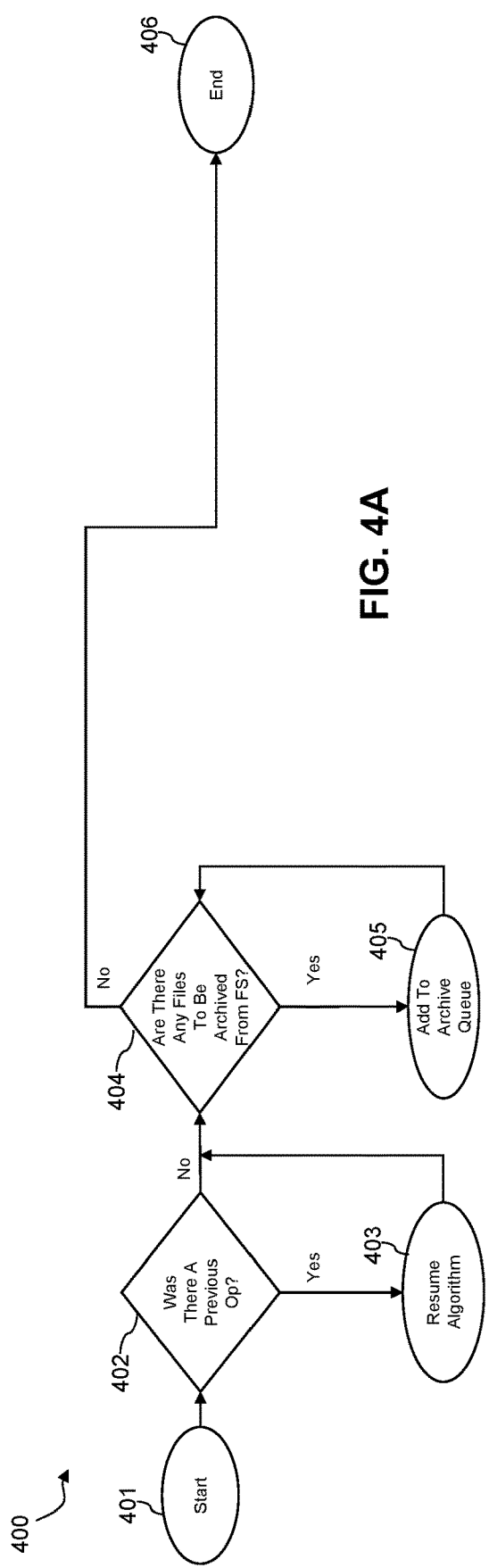
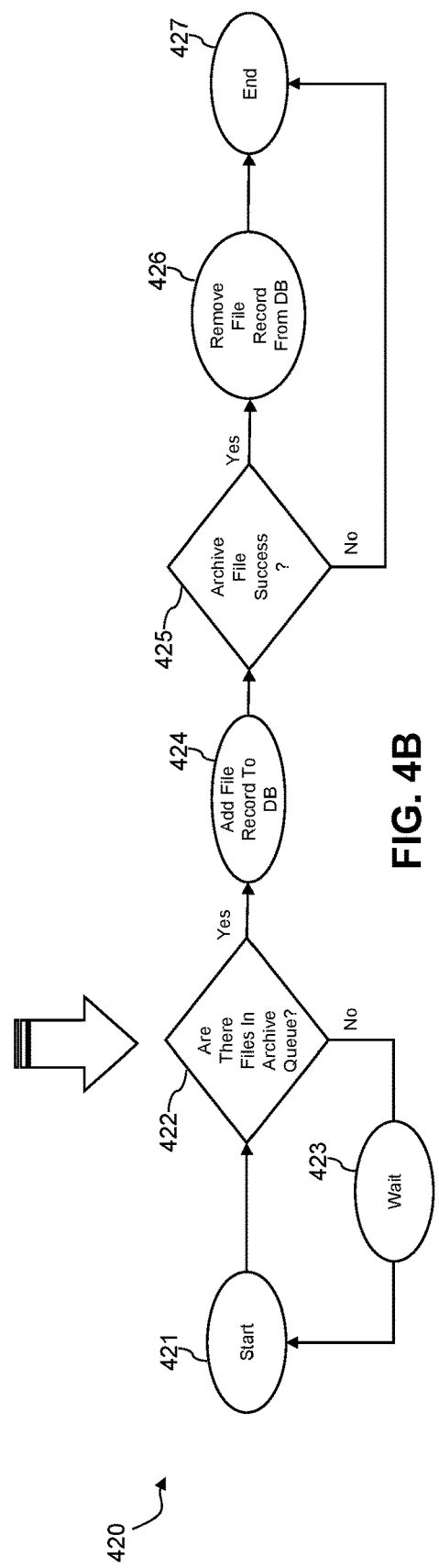
FIG. 4A
FIG. 4B

RESUME SUPPORT FOR CLOUD STORAGE OPERATIONS

FIELD

The field relates generally to information processing systems, and more particularly to storage in information processing systems.

BACKGROUND

Some current cloud-based storage solutions are task-based file solutions where files are transmitted to cloud destinations, and operations are performed on multiple files in parallel. For example, archiving or backup processes read data from numerous files in parallel and write the data to a cloud storage platform. As files can be very large and include large volumes of data, the reading and writing may be performed on smaller sized portions of the files comprising chunks of data.

Cloud storage operations occur via network protocols, and there is a possibility of failure due to, for example, crashes, network outages or other issues, before file transfer to cloud storage is completed. As a result, multiple files may be partially written to the cloud destinations when failure occurs. Under conventional approaches, after a failure, file transfer restarts from the beginning of the transfer process so that the entirety of the files that were partially written must be completely read again and resent to cloud storage. As a result, when failure occurs prior to completion of a cloud storage process, backup time and cost are increased since data that was already sent cloud storage must again be sent to the cloud destination.

SUMMARY

Illustrative embodiments provide techniques for management of cloud storage operations, including resumption of storage operations to cloud destination following operation failures.

In one embodiment, a method comprises storing information corresponding to a plurality of files being written from a source storage device to a cloud storage platform in a file transfer operation. The method further comprises, in response to a failure of the file transfer operation, identifying from the information one or more file offsets successfully written to the cloud storage platform for one or more of the plurality of the files prior to the failure. The file transfer operation for the one or more of the plurality of files is resumed from the identified one or more file offsets.

These and other illustrative embodiments include, without limitation, methods, apparatus, networks, systems and processor-readable storage media.

BRIEF DESCRIPTION OF THE DRAWINGS

FIG. 4A depicts details of a process for determining whether to apply a resume algorithm for file transfer according to an illustrative embodiment.

FIG. 4B depicts details of an operational flow for performing file transfer operations according to an illustrative embodiment.

DETAILED DESCRIPTION

Figure 1:
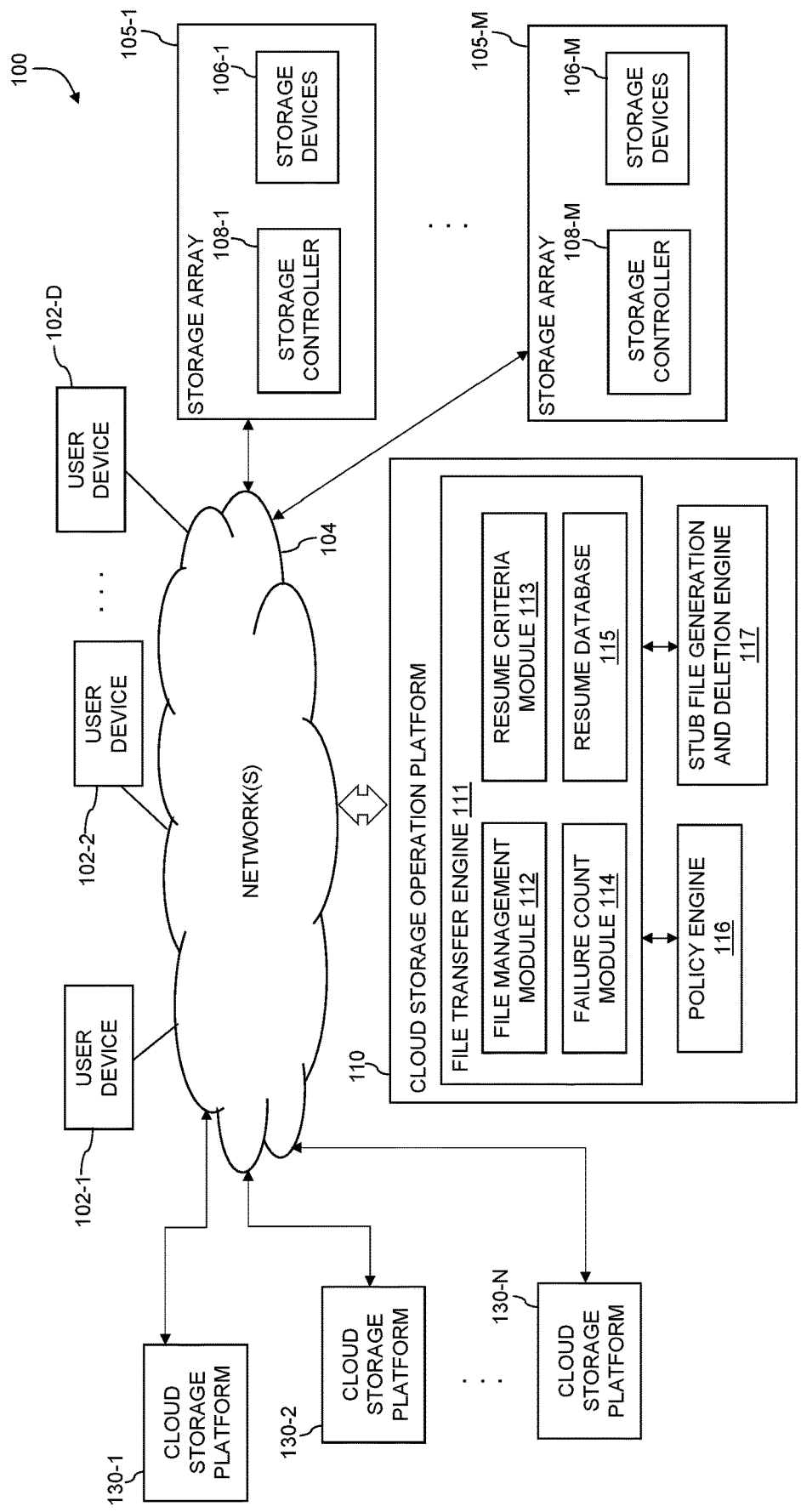
FIG. 1 depicts details of an information processing system with a cloud storage operation platform for resuming failed cloud storage operations according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "stub file" refers to a file placed in an original file location on a storage device when the original file is archived to an archive location, such as, for example, a cloud storage platform. According to an embodiment, when a stub file is read in an input-output (IO) operation, the IO operation is passed through to the original file located in the archive location, and the original file may be presented to a user as if the original file were in its original location on the storage device. The stub file occupies less memory space ("size on disk") than the original file.

As used herein, an "offset" is to be broadly construed and refers to, for example, an indication of location of data in memory or other data structure. An offset can be relative to another location, and may indicate a distance between a first location (e.g., the beginning of an object) and a location of a given element or point (e.g., for the same object). An offset can be expressed in, for example, bytes or words.

Illustrative embodiments provide techniques for management of cloud storage operations to avoid having to resend data to cloud storage when a file transfer operation (e.g., cloud archiving, cloud backup and/or cloud file tiering process) resumes after a failure event.

In an illustrative embodiment, following a failure event such as, for example, a crash, network outage, device malfunction or other issue occurring during a cloud storage process, file transfer tasks are resumed from where the file transfer tasks had progressed prior to the failure, or at least from a safe backup point. Using a cloud storage operation platform comprising, for example, a cloud tiering appliance (CTA), a database maintains information about files being archived or backed up to cloud storage. For example, the database holds details about the file offsets and the cloud objects mapped to the files. The cloud storage operation platform utilizes such details to resume file transfer operations without having to duplicate previously performed read and write operations.

FIG. 1 shows an information processing system 100 configured in accordance with an illustrative embodiment. The information processing system 100 comprises user devices 102-1, 102-2, . . . 102-D (collectively "user devices 102"). The user devices 102 communicate over a network 104 with a cloud storage operation platform 110. A non-limiting example of a cloud storage operation platform 110 comprises a CTA, but the embodiments are not necessarily limited thereto. The user devices 102 may also communicate over the network 104 with a plurality of storage arrays 105-1, . . . 105-M, collectively referred to herein as storage arrays 105. The storage arrays 105 comprise respective sets of storage devices 106-1, . . . 106-M, collectively referred to herein as storage devices 106, coupled to respective storage controllers 108-1, . . . 108-M, collectively referred to herein as storage controllers 108.

The user devices 102 can comprise, for example, Internet of Things (IoT) devices, desktop, laptop or tablet computers, mobile telephones, or other types of processing devices capable of communicating with the cloud storage operation platform 110 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as L, M, N and P are assumed to be arbitrary positive integers greater than or equal to two.

The terms "client," "customer," "administrator" or "user" herein are intended to be broadly construed so as to encompass numerous arrangements of human, hardware, software or firmware entities, as well as combinations of such entities. At least a portion of the available services and functionalities provided by the cloud storage operation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cloud storage operation platform 110, as well as to support communication between the cloud storage operation platform 110 and connected devices (e.g., user devices 102) and/or other related systems and devices not explicitly shown.

Users may refer to customers, clients and/or administrators of computing environments for which file transfer operations such as, for example, archiving, tiering and/or backing up are being performed. For example, in some embodiments, the user devices 102 are assumed to be associated with repair technicians, system administrators, information technology (IT) managers, software developers release management personnel or other authorized personnel configured to access and utilize the cloud storage operation platform 110.

The cloud storage operation platform 110 of the system 100 is configured to move data between the storage arrays 105 and one or more cloud storage platforms 130-1, 130-2, . . . 130-N, collectively referred to herein as cloud storage platforms 130. The cloud storage operation platform 110 is also configured to move data from one of the storage arrays 105 to another one of the storage arrays 105, from one of the user devices 102 to another one of the user devices 102, between the user devices 102 and one or more storage arrays 105 or one or more cloud storage platforms 130 and between different locations (e.g., directories) within the same storage array 105 or within the same user device 102.

The cloud storage operation platform 110 is configured to move data, for example, by moving data files, snapshots or other data objects in and between the user devices 102, the storage arrays 105 and the cloud storage platforms 130. A given data object may comprise a single data file, or multiple data files. According to one or more embodiments, the cloud storage operation platform 110 permits administrators to automatically move data in and between the user devices 102, the storage arrays 105 and the cloud storage platforms 130 based on user-configured policies. The cloud storage platforms 130 include, for example, Dell® EMC® Elastic Cloud Storage (ECS), Microsoft® Azure®, Amazon® S3, and/or IBM® Cloud Object Storage (COS) platforms, or other available cloud infrastructures.

The cloud storage operation platform 110 in the present embodiment is assumed to be accessible to the user devices 102, and vice-versa, over the network 104. In addition, the cloud storage operation platform 110 and the user devices 102 can access the storage arrays 105 and the cloud storage platforms 130 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud storage operation platform 110, on behalf of respective infrastructure tenants each corresponding to one or more users associated with respective ones of the user devices 102 provides a platform for resuming failed cloud storage operations. Referring to FIG. 1, the cloud storage operation platform 110 comprises a file transfer engine 111, a policy engine 116 and a stub file generation and deletion engine 117. The file transfer engine 111 comprises a file management module 112, a resume criteria module 113, a failure count module 114 and a resume database 115.

The cloud storage operation platform 110 in some embodiments comprises configurable data mover modules adapted to interact with the user devices 102, the storage arrays 105 and the cloud storage platforms 130. At least one configuration file is implemented in or otherwise associated with the cloud storage operation platform 110. The state of the configuration file may be controlled at least in part by a job scheduler implemented as part of the cloud storage operation platform 110. The job scheduler interacts with the policy engine 116.

The cloud storage operation platform 110 can include at least one application programming interface (API) that permits an external component to control selection between various modes of operation. For example, the above-noted job scheduler can access the configuration file via such an API in order to control a mode of operation of the cloud storage operation platform 110. Additionally or alternatively, an application running on one or more of the user devices 102 can access the configuration file via the API in order to control the mode of operation of the cloud storage operation platform 110.

In some embodiments, the cloud storage operation platform 110 is configurable via the configuration file in a mode of operation in which a particular type of data movement in and between user devices 102, the storage arrays 105 and the cloud storage platforms 130 occurs for a given data object being utilized by an application running on one or more of the user devices 102. Furthermore, other embodiments can configure the cloud storage operation platform 110 in different modes of operation without the use of a configuration file. Thus, such a configuration file should not be viewed as a requirement.

The cloud storage operation platform 110 is illustratively coupled to the network 104 and configured to control transfer of data in and between the user devices 102, the storage arrays 105 and the cloud storage platforms 130. The term "data movement" as used in this and other contexts herein is intended to be broadly construed, so as to encompass data migration as well as other types of movement of data and relocation in and between the user devices 102, the storage arrays 105 and the cloud storage platforms 130. A given data mover module can be implemented at least in part on storage arrays 105 or other storage platforms that implement at least portions of one or more storage tiers of the multi-tier storage system.

In one or more embodiments, the cloud storage operation platform 110 can be used to tier file data and archive block data to the cloud storage platforms 130, and to recall file data and restore block data to the storage arrays 105 from the cloud storage platforms 130. In some embodiments, the cloud storage operation platform 110 can be used to migrate repositories between cloud storage platforms 130, storage arrays and/or user devices 102.

In a file tiering process (also referred to herein as "cloud tiering") or file archiving process, the policy engine 116 is configured to identify files that fit an administrator-defined criteria, and the cloud storage operation platform 110 initiates movement of the identified files to a cloud storage platform 130. The stub file generation and deletion engine 117 creates a stub file in the original file location on, for example, the storage array 105 or the user device 102. According to an embodiment, when the stub file is read, the cloud storage operation platform 110 recalls or passes an IO operation through to the original file located in the cloud storage platform 130, and the original file may be presented to a user as if the original file were in its original location on the storage array 105 or user device 102.

In a block archiving process, the policy engine 116 identifies block snapshots that fit an administrator-defined criteria, and the cloud storage operation platform 110 initiates archiving of the identified snapshots to a cloud storage platform 130, leaving the identified snapshots in the storage arrays 105 or user devices 102. After the identified snapshots are backed up to one or more of the cloud storage platforms 130, the original snapshots can be erased from the storage arrays 105 or user devices 102 to free up space. Users may initiate restoring of one or more snapshots to one or more of the storage arrays 105 or user devices 102.

According to an embodiment, in file tiering, file archiving and block processes, the policy engine 116 scans, for example, files and/or snapshots and applies policy rules to each file and/or snapshot. If there are multiple rules in a policy, the policy engine 116 applies the rules to a given file and/or snapshot until a rule evaluates to "true," and then takes the action associated with the rule, such as, for example, "archive" or "don't archive." Some examples of rules governing whether files and/or blocks are archived may be based on or more constraints such as, for example, when a file and/or snapshot was last accessed or modified, when file or snapshot attributes were last changed, and/or a size of a file or snapshot (e.g., >10 MB). Rules may also be based on file or snapshot names (e.g., only archive files or snapshots having certain names or parts of names) and/or directory name (e.g., only archive files or snapshots from specified directories or from directories having certain names or parts of names).

According to one or more embodiments, when moving files to cloud storage, the cloud storage operation platform 110 accesses a subset of files at a given time, and dedicates a thread for each of these files to perform data movement operations on the files. Information about the subset of files is stored, and once a file is successfully moved to cloud storage, a record for the stored file is deleted and a new record for a new file to be transferred is entered. Upon successful completion of cloud storage, no records are left since every file was successfully archived. However, if there is a failure during the file transfer operation, some entries will remain.

A resume database 115 stores information corresponding to a plurality of files being written from a source storage device 106 to a cloud storage platform 130 in a file transfer operation. In illustrative embodiments, the information being stored about the files in the resume database 115 comprises, for example, file server information, file system information, protocol used (e.g., server message block (SMB) or network file system (NFS)), share or export information based on the protocol used, absolute file path (e.g., common Internet file system (CIFS) path or NFS path) or universal naming convention (UNC) path, timestamps (e.g., access timestamp (atime), modified timestamp (mtime), changed timestamp (ctime), etc.), destination/cloud storage information, object identifiers (OIDs), last file offset successfully written to cloud storage, current offset read, cloud offset matching a file offset and number of times a resume of a file transfer operation was attempted. The timestamps atime, mtime and ctime refer to Linux® timestamps, but the embodiments are not necessarily limited to Linux® timestamps and may utilize other timestamps. The access timestamp refers to the last time a file was read, where the contents of the file were displayed to a user without the contents of the file being modified. The modified timestamp refers to the last time the contents of a file were modified as a result of, for example, a program or process editing or manipulating the file. Modification of a file includes, but is not necessarily limited to, amending or deleting file data, or adding new file data. The changed timestamp refers to the time at which file metadata was changed, not to when changes are made to the contents of a file. A non-limiting example of a changed timestamp is a file permission change.

According to one or more embodiments, during a file transfer process, the file management module 112: (i) scans a file system (e.g., storage arrays 105) for files; (ii) evaluates the files; (iii) from the evaluated files, identifies a subset of the files as configured by a task; and (iv) provides a subset of the files to archiver worker threads that will back up the files to the cloud destinations (e.g., cloud storage platforms 130). If one or more files fail to be archived, backed up or otherwise stored to cloud storage, the failure count module 114 accounts for the one or more files in a failure count. If an archiver worker thread successfully archives, backs up or otherwise stores a file to cloud storage, or fails to archive, back up or otherwise store the file to cloud storage, the thread will proceed to attempt to archive, back up or otherwise store a new file to cloud storage. The file management module 112 continues an archiving process until all files are successfully archived, backed up or otherwise stored to cloud storage or a failure count has reached a configured maximum threshold, where the entire task is identified as having failed.

Figure 2:
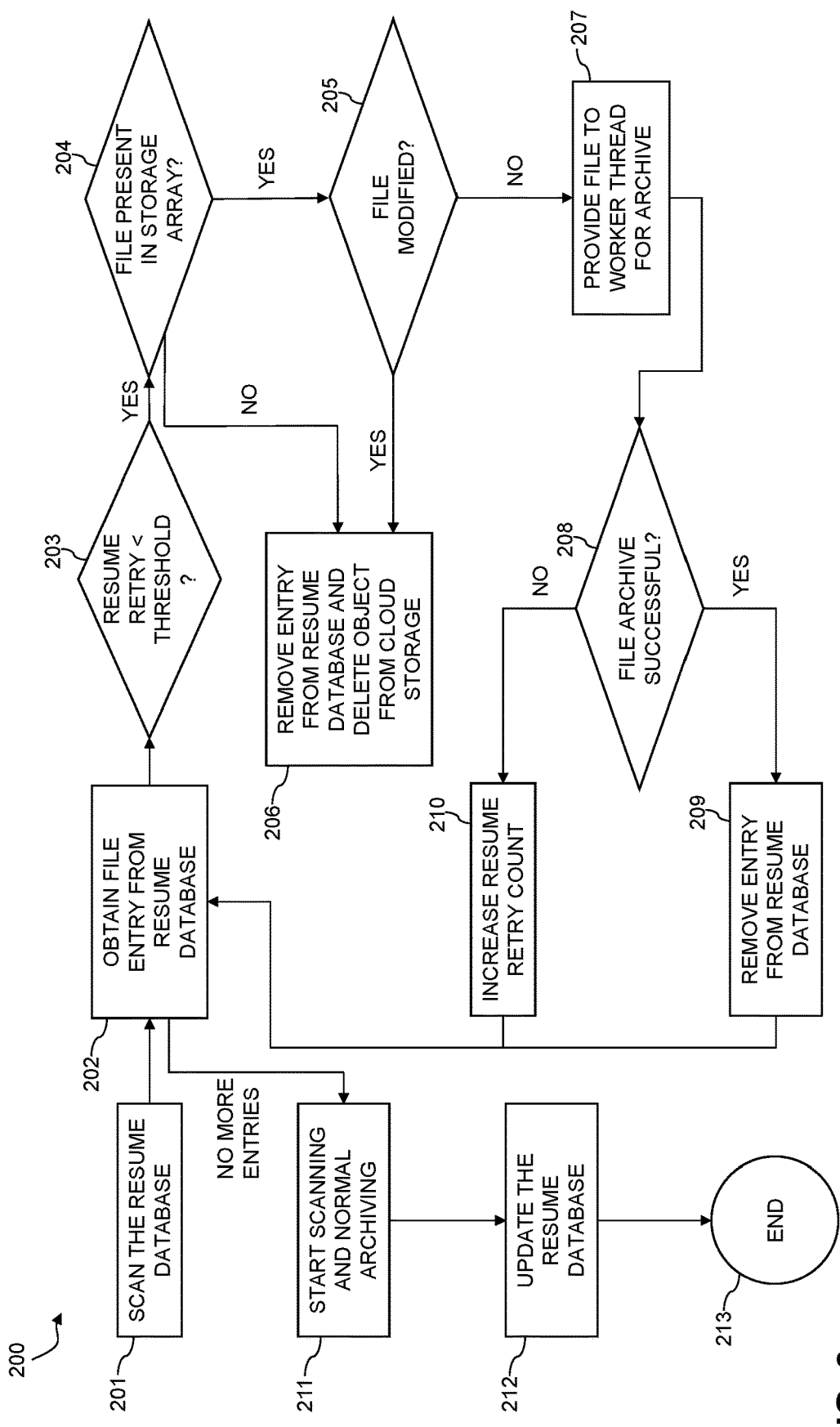
FIG. 2 depicts details of an operational flow for determining whether to resume file transfer to cloud storage following a failure event and performing file transfer operations according to an illustrative embodiment.

Referring to the process 200 in FIG. 2, in the event that a file transfer operation fails during a file transfer operation due to, for example, some failure event (e.g., crash, network outage, device malfunction or other issue occurring during a cloud storage process), at blocks 201 and 202, the file management module 112 scans the information in the resume database 115 and obtains a file entry from the resume database 115. The resume criteria module 113 determines whether the file which is the subject of the file entry meets a resume criteria prior to resuming the file transfer operation. For example, referring to block 203, the resume criteria module 113 determines whether the number of times a failed file transfer operation was resumed for the file exceeds a threshold. The information for the number of times a failed file transfer operation was resumed for a given file may be in the resume database 115 and/or the failure count module 114.

The threshold number of times may be pre-programmed and/or determined by the policy engine 116 based on the characteristics associated with the file such as, but not necessarily limited to: (i) a source path specifying a starting point of data movement (e.g., source storage location); (ii) a destination path specifying a target storage location where the files will be moved; (iii) a migration policy specifying a set of rules (e.g., constraints) to be applied by the policy engine 116 in connection with evaluating whether to migrate and after how many failed attempts to migrate particular files; (iv) protocols (e.g., SMB, NFS) being used for reading the files from the source storage location and for writing the files to the target storage location; (v) a name of the migration (e.g., share/export name); and (vi) server names or other identifying information (e.g., IP addresses) corresponding to the source and target storage locations.

If the resume retry threshold for a given file has been met or exceeded, the resumption of the failed file transfer operation does not proceed. If the threshold has not been exceeded, then the resume criteria module 113 applies additional resume criteria to determine whether the resumption of the failed file transfer operation for a given file will proceed. For example, referring to blocks 204 and 205, the resume criteria module 113 scans the source storage device (e.g., one of the storage devices 106) to determine whether the file remains in the storage array and/or whether the file has been modified. If the file does not remain (e.g., has been deleted from) the source storage device of a given storage array 105 or has been modified, then as per block 206, the entry for that particular file is removed from the resume database 115, and a corresponding object for that file that may have been created prior to the failure of the file transfer operation is deleted from the cloud storage platform 130 on which it was located. A resume file transfer operation is not performed in connection with a deleted or modified file as per blocks 204 and 205. Referring to blocks 205 and 207, if the file has not been modified, the file is provided to a worker thread for archiving or other storage operation. In determining whether the file has been modified, the resume criteria module 113 compares one or more timestamps of the file on the source storage device with one or more timestamps of the file in the resume database 115. If the timestamps are different (e.g., there is a modified timestamp for the file in the source storage device that is after a modified timestamp in the resume database 115), the file may have been modified during or after the file transfer operation so that it would not be reasonable to resume file transfer of an older/previous version of the file. Similarly, it would not be reasonable to resume file transfer of a file that has been deleted.

Referring to block 208, if the file transfer process proceeds, and the archiving or other storage operation is successful, as per block 209, the entry for that file is removed from the resume database 115, and the process repeats with another entry for another file being obtained from the resume database 115 (block 202). If the file transfer process proceeds, and the archiving or other storage operation is not successful, as per block 210, the failure count module 114 increases the resume retry count for that file (i.e., the retry count gets closer to a threshold), and the process repeats with another entry for another file being obtained from the resume database 115 (block 202).

For a resume operation, an existing cloud object from the failed operation is modified (e.g., trimmed) to a size that matches with the size of the file in the resume database 115, and reading/writing of a file proceeds from the file offset specified in the resume database 115. Successful write operations to a cloud storage platform 130 will update entries in the resume database 115 to correspond with the cloud offset. Once archiving of a file is successful, the entry for the archived file can be removed from the resume database 115, and upon failure of an archiving operation, the entry for the archived file will be left intact in the resume database 115.

If there are no entries in or remaining in the resume database 115, scanning of a storage array and normal (i.e., not resumed) file transfer operations proceed (block 211) and, at block 212, the resume database 115 is updated with details for the files being transferred during the normal file transfer operations in case there is a failure before the normal file transfer operations are completed. For example, as described herein, the details for the files being transferred include file offsets successfully written to a cloud storage platform 130 for the files prior to the failure, so that the file transfer operation for the files can be resumed from the file offsets, without having to re-read and re-write the files that were already partially read and written to a cloud destination. The process 200 ends at block 213.

Figure 3:
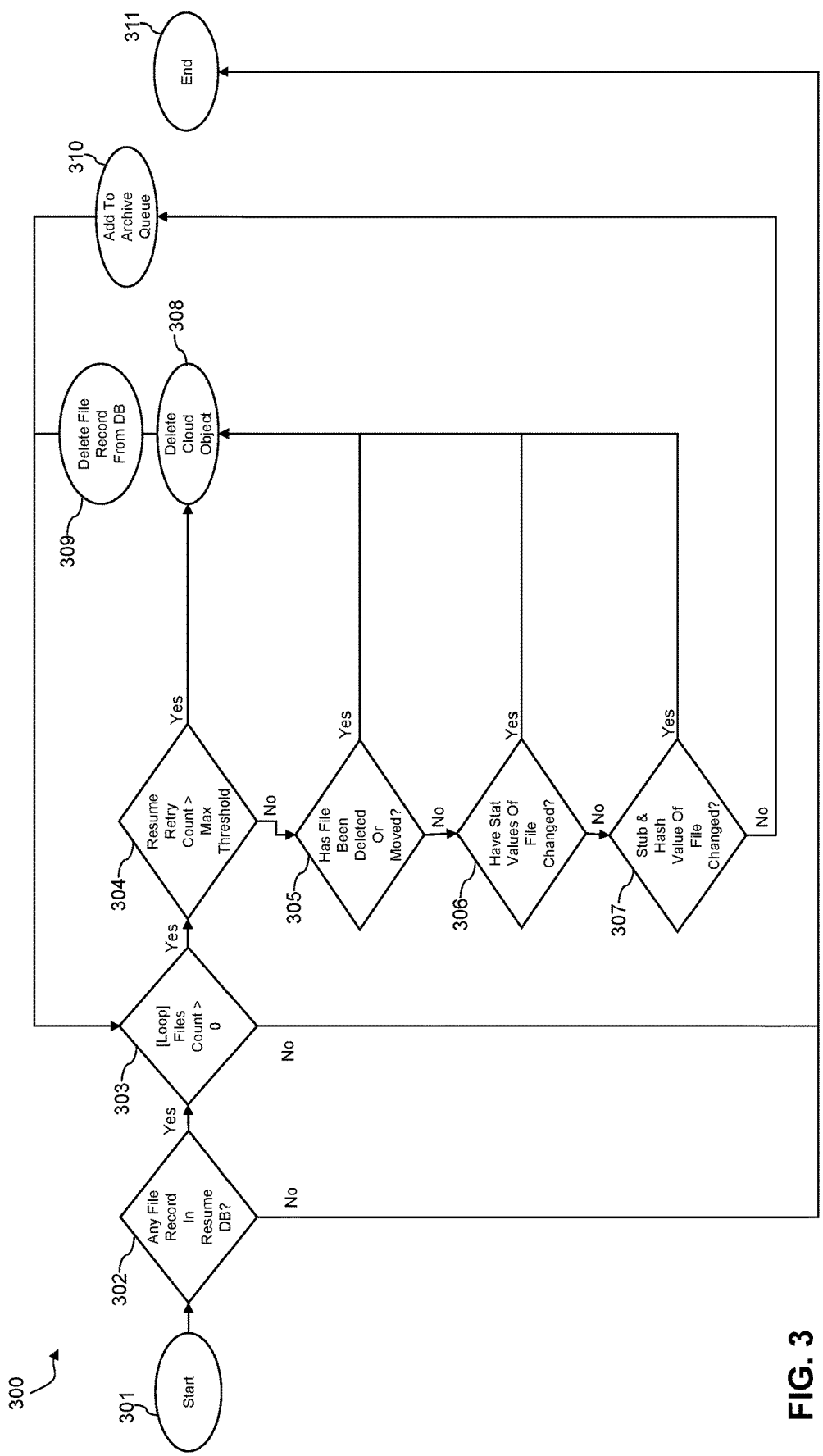
FIG. 3 depicts details of an operational flow for determining whether to resume file transfer to cloud storage following a failure event and adding files to a file transfer queue according to an illustrative embodiment.

Referring to FIG. 3, another process 300 following a file transfer operation failure begins with block 301 and ends with block 311. At block 302, it is determined whether there is a file record in the resume database 115. If not, the process proceeds to block 311 and ends. If there is a record in the resume database 115, the process proceeds to block 303, where it is determined whether there remain any files to be transferred to cloud storage. If not, the process proceeds to block 311 and ends. If there remain any files to be transferred to cloud storage, the process proceeds to block 304, which is similar to block 203 in FIG. 2, where the resume criteria module 113 refers to the resume database 115 and/or the failure count module 114 to determine whether the number of times that a failed file transfer operation was resumed for a given file exceeds a threshold. If the number of times that a failed file transfer operation was resumed for a given file exceeds a threshold, then as per blocks 308 and 309, a corresponding object for that file that may have been created prior to the failure of the file transfer operation is deleted from the cloud storage platform 130 on which it was located, the entry for that particular file is removed from the resume database 115, and a file transfer operation is not performed on the given file.

Referring to block 305, if the number of times that a failed file transfer operation was resumed for a given file does not exceed a threshold, the resume criteria module 113 further determines by, for example, scanning a given storage array 105, whether the given file has been deleted or moved to a different storage array 105. If yes, then the process 300 proceeds to blocks 308 and 309 as described above, and a file transfer operation is not performed on the given file. If no at block 305, the resume criteria module 113 further determines, at block 306, whether any Stat values (e.g., timestamps) for the file have changed. Similar to the determination of whether a file has been modified in block 205, at block 306, the resume criteria module 113 compares one or more timestamps of the file on the source storage device with one or more timestamps of the file in the resume database 115 to determine any differences. If yes at block 306, then the process 300 proceeds to blocks 308 and 309 as described above, and a file transfer operation is not performed on the given file.

If no at block 306, the resume criteria module 113 further determines, at block 307, whether stub and/or hash values of the file have changed. If no at block 307, the file is added to the archive queue as per block 310, and resumption of the file transfer operation for that file is executed. If yes at block 307 indicating some changes to the file, then the process 300 proceeds to blocks 308 and 309 as described above, and a file transfer operation is not performed on the given file. Following steps 309 and 310, the process 300 loops back to block 303, where it is determined whether there remain any files to be transferred to cloud storage.

According to illustrative embodiments, an additional criteria applied by the resume criteria module 113 includes, for example, file size. For example, if a data moving process has a specified amount of file data that is archived at a given time (e.g., 60 MB) and a file size is less than the specified amount, resume capability is not supported for such a file. In this example, if a file has a size less than or equal to 60 MB, resumption of a failed storage operation is not supported. Conversely, if a file has a size greater than 60 MB, resume is supported. As noted above, the criteria applied by the resume criteria module 113 further includes consideration of whether a file has been modified. For example, if a file has changed between the previously failed archiving process, and a time for resumption of the archiving process, resuming of the archiving process for that file may not be permitted. In this case, when file data is changed, it will be re-archived and any partial cloud object created prior to the failure of the backup will be deleted. The criteria applied by the resume criteria module 113 further includes consideration of whether a file has been deleted between the previously failed archiving process, and a time for resumption of the archiving process. If a file no longer exists, there will be no need to resume backup of a deleted file. As noted above, the criteria also includes consideration of whether a threshold has been reached for retrying a failed archiving operation. For example, if a maximum retry limit for retrying failed archiving operations has been reached, then the retry operation will not proceed.

Referring to FIG. 4A, a process 400 for determining whether to apply a resume algorithm for file transfer is shown. The process 400 starts at block 401, and then at block 402 the file management module 112 queries whether a previous file transfer operation was attempted and failed. If yes, then as per block 403, a resume algorithm as described, for example, in connection with FIGS. 2 and 3 is executed, where file data from a resume database 115 is evaluated and a resume criteria is applied by the resume criteria module 113. If no at block 402, then the process proceeds to block 404 where the file management module 112 queries whether there are any files to be transferred to a cloud storage platform 130 from a source file system (e.g., storage array 105). If no, the process 400 ends at block 406. If yes at block 404, the process 400 proceeds to block 405, where the files to be archived, backed up or otherwise transferred to cloud storage are added to an archive queue.

Referring to FIG. 4B, an operational flow 420 for performing file transfer operations is shown, where data is pulled from an archive queue. The operational flow 420 starts at block 421, and proceeds to block 422 where the file management module 422 queries whether there are files in the archive queue. If no, the file management module waits a predetermined amount of time (block 423), and again proceeds to block 422 to query whether there are files in the archive queue. Once an affirmative response is received at block 422, the process proceeds to block 424 where file records are added to the resume database 115. At block 425, if file archiving, backing up or other storage is successful, the operational flow 420 proceeds to block 426, where the file management module 112 removes the file record from the resume database 115, and the operational flow 420 ends at block 427. At block 425, if file archiving, backing up or other storage is not successful, the operational flow 420 proceeds to block 427 and ends.

According to one or more embodiments, the resume database 115 used herein can be configured according to a relational database management system (RDBMS) (e.g., PostgreSQL). The resume database 115 in some embodiments is implemented using one or more storage systems or devices associated with the cloud storage operation platform 110. In some embodiments, one or more of the storage systems utilized to implement the databases comprise a scale-out all-flash content addressable storage array or other type of storage array. Similarly, the storage arrays 105 described herein may comprise scale-out all-flash content addressable storage arrays or other type of storage arrays.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cloud storage operation platform 110, the file transfer engine 111, the policy engine 116 and the stub file generation and deletion engine 117 in other embodiments can be implemented at least in part externally to the cloud storage operation platform 110, for example, as stand-alone servers, sets of servers or other types of systems coupled to the network 104. For example, the file transfer engine 111, the policy engine 116 and the stub file generation and deletion engine 117 may be provided as cloud services accessible by the cloud storage operation platform 110.

The file transfer engine 111, the policy engine 116 and the stub file generation and deletion engine 117 in the FIG. 1 embodiment are each assumed to be implemented using at least one processing device. Each such processing device generally comprises at least one processor and an associated memory, and implements one or more functional modules for controlling certain features of the file transfer engine 111, the policy engine 116 and/or the stub file generation and deletion engine 117.

At least portions of the cloud storage operation platform 110 and the components thereof may be implemented at least in part in the form of software that is stored in memory and executed by a processor. The cloud storage operation platform 110 and the components thereof comprise further hardware and software required for running the cloud storage operation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the file transfer engine 111, the policy engine 116, the stub file generation and deletion engine 117 and other components of the cloud storage operation platform 110 in the present embodiment are shown as part of the cloud storage operation platform 110, at least a portion of the file transfer engine 111, the policy engine 116, the stub file generation and deletion engine 117 and other components of the cloud storage operation platform 110 in other embodiments may be implemented on one or more other processing platforms that are accessible to the cloud storage operation platform 110 over one or more networks. Such components can each be implemented at least in part within another system element or at least in part utilizing one or more stand-alone components coupled to the network 104.

It is assumed that the cloud storage operation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the file transfer engine 111, the policy engine 116, the stub file generation and deletion engine 117 and other components of the cloud storage operation platform 110, and the elements thereof can each be implemented in the form of one or more LXCs running on one or more VMs. Other arrangements of one or more processing devices of a processing platform can be used to implement the file transfer engine 111, the policy engine 116 and the stub file generation and deletion engine 117, as well as other components of the cloud storage operation platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cloud storage operation platform 110 to reside in different data centers. Numerous other distributed implementations of the cloud storage operation platform 110 are possible.

Accordingly, one or each of the file transfer engine 111, the policy engine 116, the stub file generation and deletion engine 117 and other components of the cloud storage operation platform 110 can each be implemented in a distributed manner so as to comprise a plurality of distributed components implemented on respective ones of a plurality of compute nodes of the cloud storage operation platform 110.

It is to be appreciated that these and other features of illustrative embodiments are presented by way of example only, and should not be construed as limiting in any way.

Accordingly, different numbers, types and arrangements of system components such as the file transfer engine 111, the policy engine 116, the stub file generation and deletion engine 117 and other components of the cloud storage operation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cloud storage operation platform can be offered to cloud infrastructure customers or other users as part of FaaS, CaaS and/or PaaS offerings.

Figure 5:
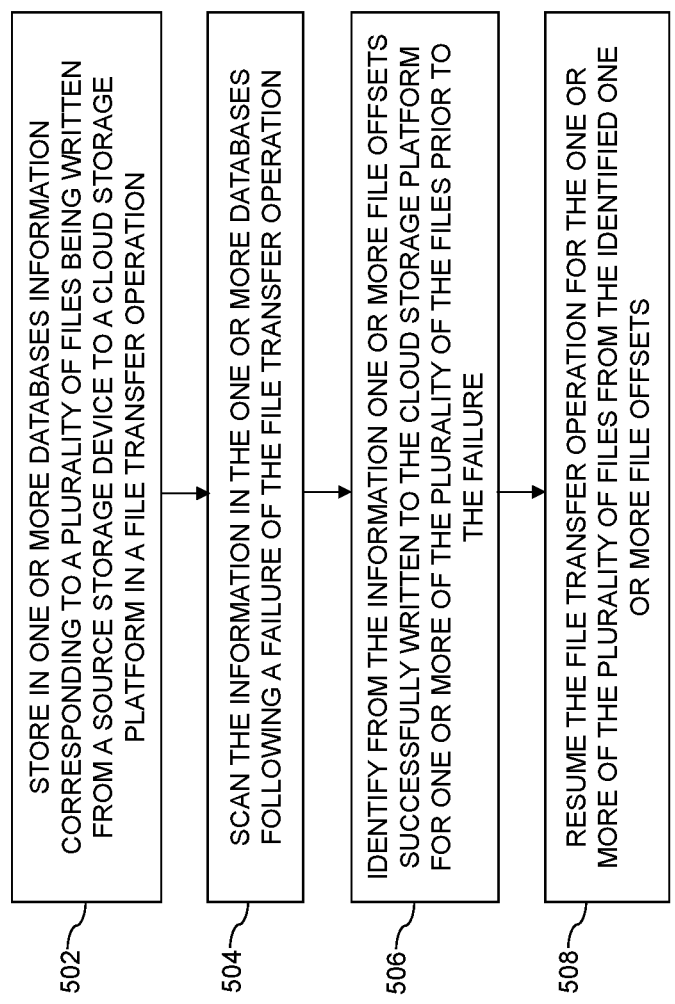
FIG. 5 depicts a process for resuming failed cloud storage operations according to an illustrative embodiment.

The operation of the information processing system 100 will now be described in further detail with reference to the flow diagram of FIG. 5. With reference to FIG. 5, a process 500 for resuming failed cloud storage operations as shown includes steps 502 through 508, and is suitable for use in the system 100 but is more generally applicable to other types of information processing systems comprising a cloud storage operation platform configured for resuming failed cloud storage operations.

In step 502, one or more databases store information corresponding to a plurality of files being written from a source storage device to a cloud storage platform in a file transfer operation. The information comprises, for each of the plurality of files, at least one of an access timestamp, a modified timestamp, a changed timestamp, a file size, a file path, an object identifier, a read offset, a storage protocol and a number of times to a failed file transfer operation was resumed.

In step 504, the information in the one or more databases is scanned following a failure of the file transfer operation. In step 506, one or more file offsets successfully written to the cloud storage platform for one or more of the plurality of the files prior to the failure are identified from the information in the one or more databases. In one or more embodiments, a size of cloud objects for the one or more of the plurality of files is modified to correspond to the identified one or more file offsets.

In step 508, the file transfer operation for the one or more of the plurality of files is resumed from the identified one or more file offsets. The information corresponding to the one or more of the plurality of files is removed from the one or more databases following successful completion of the file transfer operation.

The process may include determining whether the one or more of the plurality of files meets a resume criteria prior to resuming the file transfer operation for the one or more of the plurality of files. Determining whether the one or more of the plurality of files meets the resume criteria comprises (i) determining whether the one or more of the plurality of files has exceeded a threshold for a number of times to resume a failed file transfer operation; (ii) determining whether the one or more of the plurality of files have been deleted from the source storage device prior to resuming the file transfer operation for the one or more of the plurality of files; (iii) determining whether the one or more of the plurality of files on the source storage device have been modified prior to resuming the file transfer operation for the one or more of the plurality of files; and/or (iv) determining whether the one or more of the plurality of files has exceeded a file size threshold.

According to one or more embodiments, the process includes deleting one or more objects from the cloud storage platform corresponding to the one or more of the plurality of files that have been deleted from the source storage device and/or modified. In addition, the one or more of the plurality of files that have been deleted from the source storage device and/or modified are omitted from the resumed file transfer operation.

Determining whether the one or more of the plurality of files have been modified comprises comparing one or more timestamps of the one or more of the plurality of files on the source storage device with one or more timestamps of the one or more of the plurality of files in the one or more databases.

It is to be appreciated that the FIG. 5 process and other features and functionality described above can be adapted for use with other types of information systems configured to execute file transfer resume services in a cloud storage operation platform or other type of platform.

The particular processing operations and other system functionality described in conjunction with the flow diagram of FIG. 5 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cloud storage operation platform as disclosed herein can provide a number of significant advantages relative to conventional arrangements. For example, unlike conventional techniques, the embodiments advantageously enable resumption of failed file transfer operations instead of re-starting a cloud storage operation from the beginning where entire files must be re-archived. With the resume capability, archive, back up or other storage processes can be re-started from where they failed, thereby reducing file transfer completion time and cost, and increasing performance. Moreover, absent the techniques of the disclosed embodiments, many thousands of bytes would need to be re-read and re-written and sent over a network. Accordingly, the embodiments reduce network traffic and overhead.

When using conventional approaches, if there is a failure when files are partially written to cloud destinations, next run of the task starts the same process from the beginning and the files that were partially written are read again in their entirety and sent to cloud storage. There is no resume capability with current techniques. As a result, multiple files are re-read and re-written so that the time taken to complete a task is unnecessarily long and the cost undesirably high.

Advantageously, the embodiments scan a resume database for file entries for which resumption may be required (e.g., archiving process failed) and remove the entries and their corresponding cloud objects which have reached or exceeded a resume retry threshold. As an additional advantage, the embodiments check for the existence in a source file system of each file in the resume database, and if a file does not exist in the source file system, remove the entry and its corresponding cloud object. Timestamps of the files in the resume database are compared with current file timestamps to determine whether there have been any changes to the files, and if a file has been changed, the entry is removed from the resume database and its corresponding cloud object is also removed from cloud storage. If a file has not changed, the file is sent to a thread for executing resumption of a file transfer process for the file.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cloud storage operation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud storage operation platform in illustrative embodiments. These and other cloud-based systems in illustrative embodiments can include object stores.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
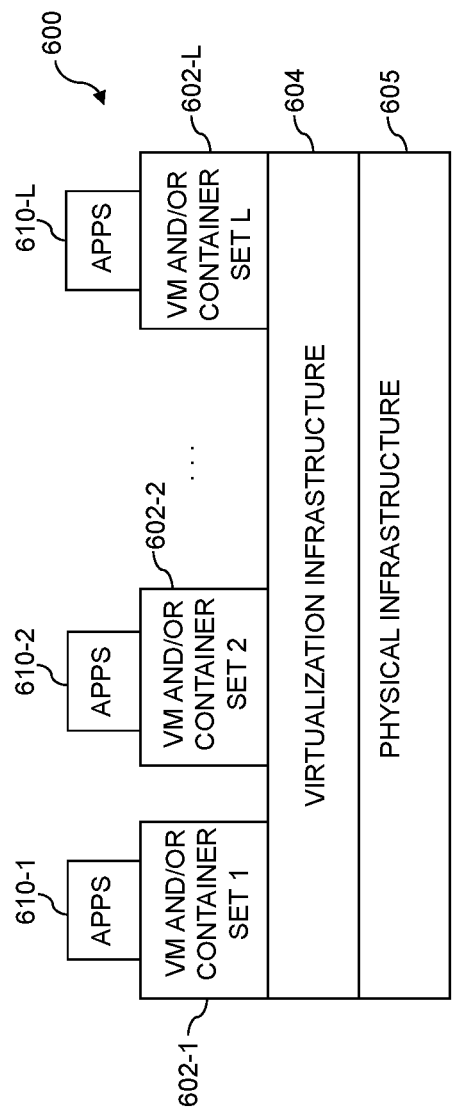
FIGS. 6 and 7 show examples of processing platforms that may be utilized to implement at least a portion of an information processing system according to illustrative embodiments.
Figure 7:
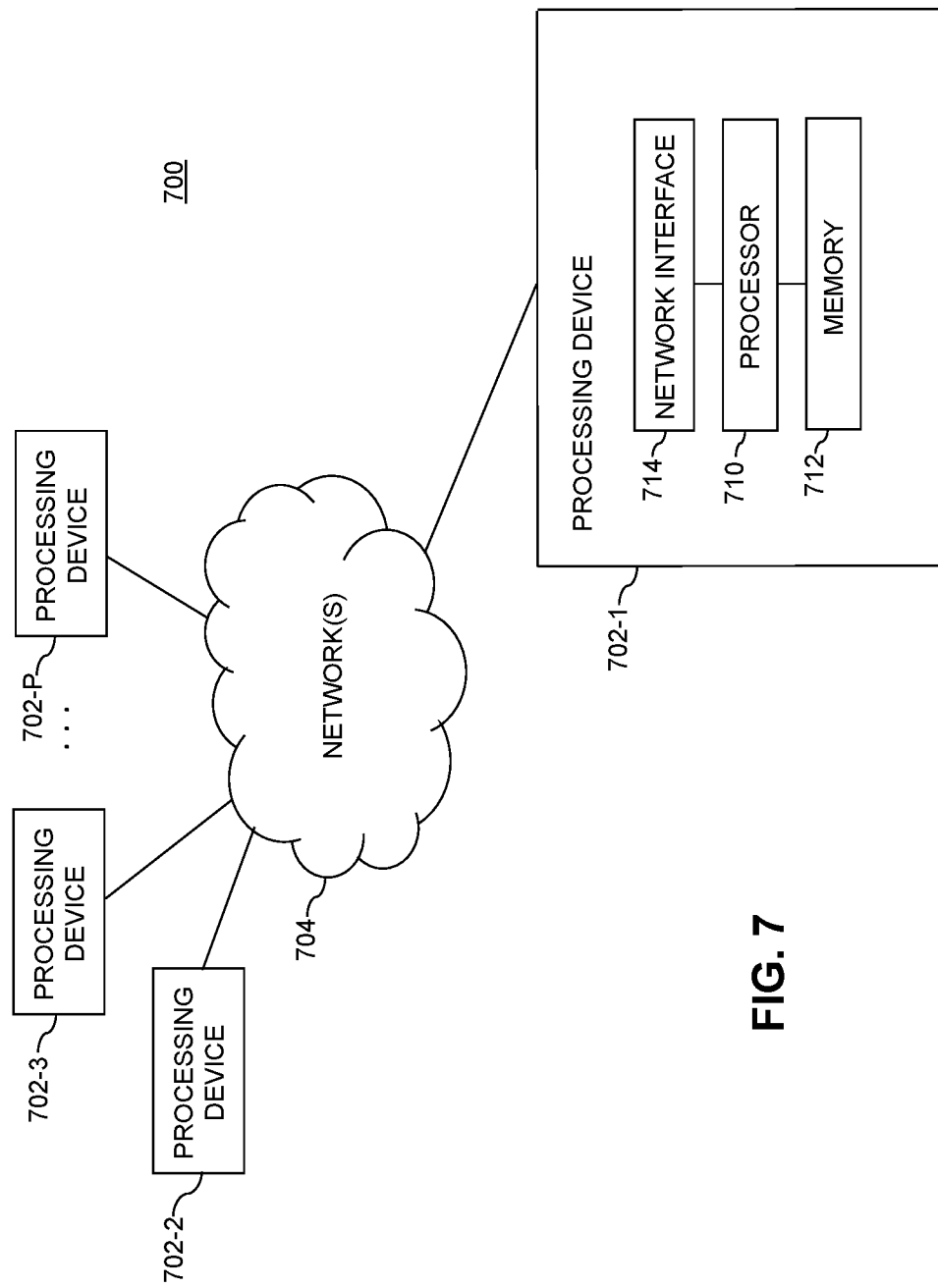

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-P, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It is to be appreciated that steps/operations that are described as being performed by a processing platform can be directly performed by the processing platform and/or the processing platform can cause the step/operation to be performed by another component by the processing platform sending one or more instructions or messages to the other component.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cloud storage operation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cloud storage operation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to a memory;
said at least one processing platform being configured:
to store information corresponding to a plurality of files being written from a source storage device to a cloud storage platform in a file transfer operation, wherein the information corresponding to the plurality of files is stored in one or more databases;
in response to a failure of the file transfer operation, to identify from the information one or more file offsets successfully written to the cloud storage platform for one or more of the plurality of the files prior to the failure;
to cause resumption of the file transfer operation for the one or more of the plurality of files from the identified one or more file offsets;
to determine whether the one or more of the plurality of files meets a resume criteria prior to the resumption of the file transfer operation for the one or more of the plurality of files;
wherein, in determining whether the one or more of the plurality of files meets the resume criteria, said at least one processing platform is configured:
to determine whether the one or more of the plurality of files have been deleted from the source storage device prior to the resumption of the file transfer operation for the one or more of the plurality of files and are unavailable for transmission to the cloud storage platform during a resumed file transfer operation for the one or more of the plurality of files; and
to determine whether the one or more of the plurality of files on the source storage device have been modified prior to the resumption of the file transfer operation for the one or more of the plurality of files;
to cause deletion from the one or more databases of information corresponding to the one or more of the plurality of files that have been deleted from the source storage device;
to cause omission of the one or more of the plurality of files that have been modified from the resumed file transfer operation;
to cause archiving to the cloud storage platform of the one or more of the plurality of files that have been modified in another file transfer operation; and
to cause deletion from the cloud storage platform of one or more partial objects corresponding to the one or more of the plurality of files that have been modified, wherein the one or more partial objects were partially written to the cloud storage platform due to the failure of the file transfer operation.

2. The apparatus of claim 1 wherein, in determining whether the one or more of the plurality of files meets the resume criteria, said at least one processing platform is further configured to determine whether the one or more of the plurality of files has exceeded a threshold for a number of times to resume a failed file transfer operation.

3. The apparatus of claim 1 wherein said at least one processing platform is further configured:
  to cause deletion of one or more objects from the cloud storage platform corresponding to the one or more of the plurality of files that have been deleted from the source storage device; and
  to cause omission of the one or more of the plurality of files that have been deleted from the source storage device from the resumed file transfer operation.

4. The apparatus of claim 1 wherein, in determining whether the one or more of the plurality of files have been modified, said at least one processing platform is configured to compare one or more timestamps of the one or more of the plurality of files on the source storage device with one or more timestamps of the one or more of the plurality of files stored in the one or more databases.

5. The apparatus of claim 1 wherein, in determining whether the one or more of the plurality of files meets the resume criteria, said at least one processing platform is further configured to determine whether the one or more of the plurality of files has exceeded a file size threshold.

6. The apparatus of claim 1 wherein said at least one processing platform is further configured to cause modification of a size of cloud objects for the one or more of the plurality of files to correspond to the identified one or more file offsets.

7. The apparatus of claim 1 wherein said at least one processing platform is further configured to remove from the one or more databases the information corresponding to the one or more of the plurality of files following successful completion of the file transfer operation.

8. The apparatus of claim 1 wherein the information corresponding to the plurality of files comprises for each of the plurality of files at least one of an access timestamp, a modified timestamp, a changed timestamp, a file size, a file path, an object identifier, a read offset, a storage protocol and a number of times to a failed file transfer operation was resumed.

9. The apparatus of claim 1 wherein said at least one processing platform comprises a cloud tiering appliance.

10. A method comprising:
  storing information corresponding to a plurality of files being written from a source storage device to a cloud storage platform in a file transfer operation, wherein the information corresponding to the plurality of files is stored in one or more databases;
  in response to a failure of the file transfer operation, identifying from the information one or more file offsets successfully written to the cloud storage platform for one or more of the plurality of the files prior to the failure;
  causing resumption of the file transfer operation for the one or more of the plurality of files from the identified one or more file offsets;
  determining whether the one or more of the plurality of files meets a resume criteria prior to the resumption of the file transfer operation for the one or more of the plurality of files;
  wherein determining whether the one or more of the plurality of files meets the resume criteria comprises:
    determining whether the one or more of the plurality of files have been deleted from the source storage device prior to the resumption of the file transfer operation for the one or more of the plurality of files and are unavailable for transmission to the cloud storage platform during a resumed file transfer operation for the one or more of the plurality of files; and
    determining whether the one or more of the plurality of files on the source storage device have been modified prior to the resumption of the file transfer operation for the one or more of the plurality of files;
  causing deletion from the one or more databases of information corresponding to the one or more of the plurality of files that have been deleted from the source storage device;
  causing omission of the one or more of the plurality of files that have been modified from the resumed file transfer operation;
  cause archiving to the cloud storage platform of the one or more of the plurality of files that have been modified in another file transfer operation; and
  causing deletion from the cloud storage platform of one or more partial objects corresponding to the one or more of the plurality of files that have been modified, wherein the one or more partial objects were partially written to the cloud storage platform due to the failure of the file transfer operation
  wherein the method is performed by at least one processing platform comprising at least one processing device comprising a processor coupled to a memory.

11. The method of claim 10 further comprising:
  causing deletion of one or more objects from the cloud storage platform corresponding to the one or more of the plurality of files that have been deleted from the source storage device; and
  causing omission of the one or more of the plurality of files that have been deleted from the source storage device from the resumed file transfer operation.

12. A computer program product comprising a non-transitory processor-readable storage medium having stored therein program code of one or more software programs, wherein the program code when executed by at least one processing platform causes said at least one processing platform:
  to store information corresponding to a plurality of files being written from a source storage device to a cloud storage platform in a file transfer operation, wherein the information corresponding to the plurality of files is stored in one or more databases;
  in response to a failure of the file transfer operation, to identify from the information one or more file offsets successfully written to the cloud storage platform for one or more of the plurality of the files prior to the failure;
  to cause resumption of the file transfer operation for the one or more of the plurality of files from the identified one or more file offsets;
  to determine whether the one or more of the plurality of files meets a resume criteria prior to the resumption of the file transfer operation for the one or more of the plurality of files;
  wherein, in determining whether the one or more of the plurality of files meets the resume criteria, the program code causes said at least one processing platform:
    to determine whether the one or more of the plurality of files have been deleted from the source storage device prior to the resumption of the file transfer operation for the one or more of the plurality of files and are unavailable for transmission to the cloud storage platform during a resumed file transfer operation for the one or more of the plurality of files; and to determine whether the one or more of the plurality of files on the source storage device have been modified prior to the resumption of the file transfer operation for the one or more of the plurality of files;

to cause deletion from the one or more databases of information corresponding to the one or more of the plurality of files that have been deleted from the source storage device;

to cause omission of the one or more of the plurality of files that have been modified from the resumed file transfer operation;

to cause archiving to the cloud storage platform of the one or more of the plurality of files that have been modified in another file transfer operation; and to cause deletion from the cloud storage platform of one or more partial objects corresponding to the one or more of the plurality of files that have been modified, wherein the one or more partial objects were partially written to the cloud storage platform due to the failure of the file transfer operation.

13. The computer program product of claim 12 wherein, in determining whether the one or more of the plurality of files meets the resume criteria, the program code further causes said at least one processing platform to determine whether the one or more of the plurality of files has exceeded a threshold for a number of times to resume a failed file transfer operation.

14. The computer program product of claim 12 wherein the program code further causes said at least one processing platform:

to cause deletion of one or more objects from the cloud storage platform corresponding to the one or more of the plurality of files that have been deleted from the source storage device; and to cause omission of the one or more of the plurality of files that have been deleted from the source storage device from the resumed file transfer operation.

15. The computer program product of claim 12 wherein, in determining whether the one or more of the plurality of files have been modified, the program code causes said at least one processing platform to compare one or more timestamps of the one or more of the plurality of files on the source storage device with one or more timestamps of the one or more of the plurality of files stored in the one or more databases.

16. The computer program product of claim 12 wherein, in determining whether the one or more of the plurality of files meets the resume criteria, the program code further causes said at least one processing platform to determine whether the one or more of the plurality of files has exceeded a file size threshold.

17. The computer program product of claim 12 wherein the program code further causes said at least one processing platform to cause modification of a size of cloud objects for the one or more of the plurality of files to correspond to the identified one or more file offsets.

18. The computer program product of claim 12 wherein the program code further causes said at least one processing platform to remove from the one or more databases the information corresponding to the one or more of the plurality of files following successful completion of the file transfer operation.

19. The method of claim 10 wherein determining whether the one or more of the plurality of files have been modified comprises comparing one or more timestamps of the one or more of the plurality of files on the source storage device with one or more timestamps of the one or more of the plurality of files stored in the one or more databases.

20. The method of claim 10 wherein determining whether the one or more of the plurality of files meets the resume criteria further comprises determining whether the one or more of the plurality of files has exceeded a file size threshold.

* * * * *